United States Patent Office 3,267,371
Patented August 16, 1966

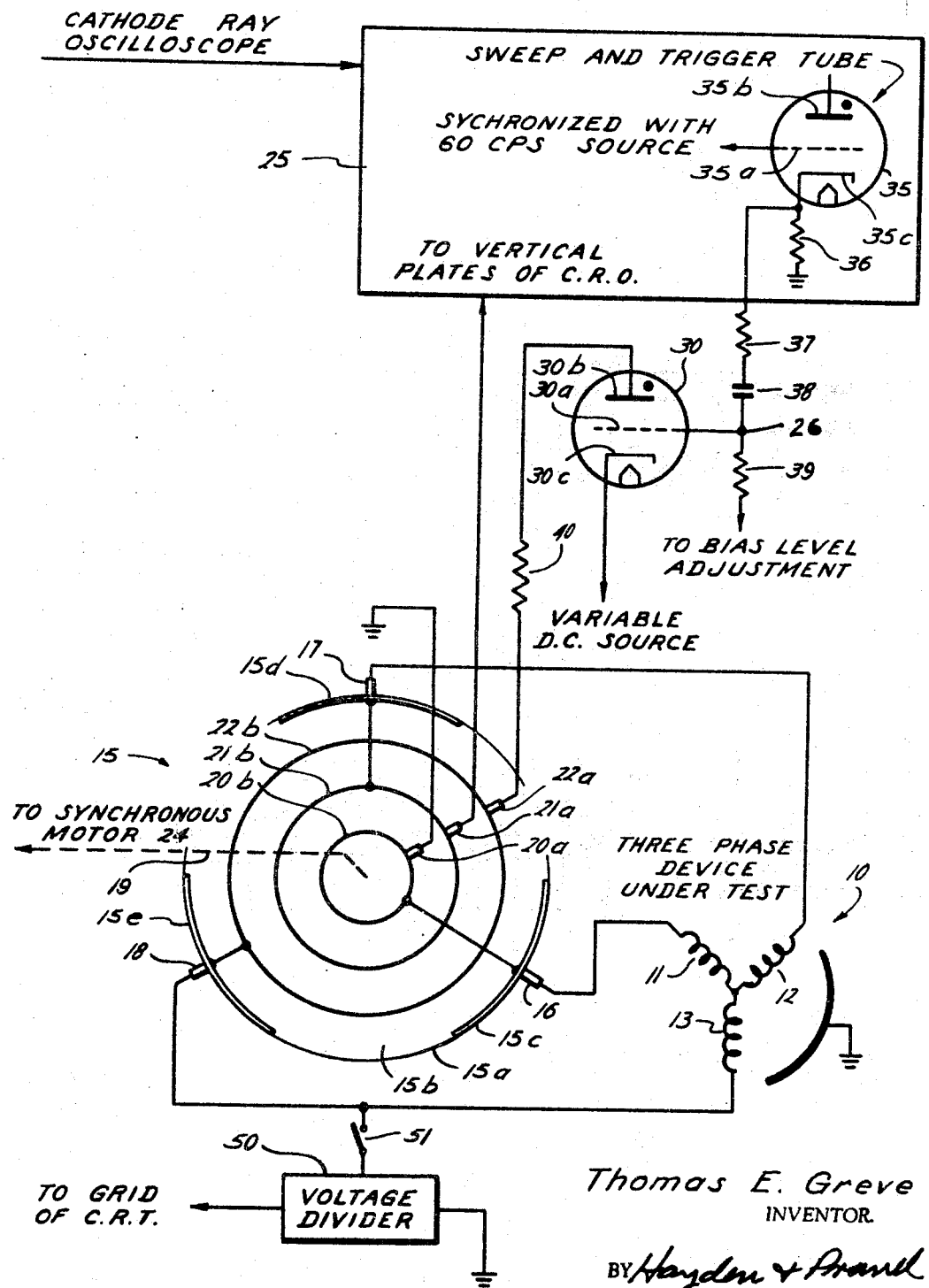

3,267,371
COIL TESTING DEVICE HAVING A SOURCE OF PULSED ENERGY AND COMMUTATOR MEANS SYNCHRONIZED WITH THE ENERGY SOURCE FOR PROVIDING A VISUAL INDICATION AND COMPARISON
Thomas E. Greve, P.O. Box 7822, Houston, Tex.
Filed May 15, 1963, Ser. No. 280,688
7 Claims. (Cl. 324—55)

This invention relates to a test instrument particularly adapted for testing coils, windings, or the like for similarity with respect to one another.

Many electrical devices are constructed by placing a coil or winding on or around a frame or member designed to concentrate flux into a designated or controlled magnetic path. Alternators and transformers are examples of equipment having coils of wire wound on a frame which provides a high permeability path for concentration of the flux created by current flow through the coils of wire. Moreover, large electrical devices are generally multiple phase devices and commonly have three sets of windings or coils for connection to the three phase electrical systems commonly available. Maximum efficiency is achieved by designing and building the three windings or coils to be attached to the electrical power system identically so that each phase or winding will carry an equal share of the load imposed on the device. The idea of similarity of one coil with respect to another includes all factors which will vary or alter the electrical characteristics of the coils. The number of turns, their shape, and distribution, the reluctance of the flux conducting path, and many other factors will cause supposedly identical coils to have dissimilar characteristics.

This invention tests one coil and then compares the test results against the test results derived from another coil. While this invention is particularly adapted for use with multiple winding devices, it may be used to test a plurality of single winding devices as will be more fully explained hereinafter.

An object of this invention is to provide a test device for use with a plurality of coils or windings in determining similarity of one coil with respect to another.

An important object of this invention is to provide a new and improved test device for use with a plurality of coils to create a visual indication related to each coil which may be compared with a visual indication derived from a supposedly identical coil or with a standard indication.

A further object of this invention is to provide a new and improved test device which tests a plurality of coils at a high rate of speed so that a quick comparison of the test results from each may be quickly made.

Another object of this invention is to provide a new and improved test device which tests multiple phase devices with only one attachment thereto and forms indications relating to all the windings or coils of the device without further manipulation of the test device.

Other objects and advantages of the present invention will become apparent from a consideration of the following description and drawings wherein:

The drawing is a schematic representation of the circuitry of this invention connected to a three phase device which is to be tested.

In the drawing, numeral 10 generally designates a three phase device under test. The specimen 10 is connected to a commutator 15 which is mounted on a shaft 19 and rotated by a synchronous motor 24. The commutator 15 forms electrical connections which will be more fully explained hereinafter. A cathode ray oscilloscope 25 provides a trigger pulse through junction 26 for a thyratron 30 from the trigger tube 35 commonly found in a cathode ray oscilloscope. The thyratron 30 forms a pulse of energy which is connected by the commutator 15 to the specimen 10. The pulse passes through one winding of the specimen 10 while the cathode ray oscilloscope 25 is connected to another winding of the specimen 10. The cathode ray oscilloscope 25 forms a visual indication related to the winding connected thereto since it is synchronized with the energy discharged into the specimen 10. The commutator 15 then connects the windings of the specimen 10 differently to form a new idication on the face of the cathode ray oscilloscope 25. The operator of the invention may then compare the indications for similarity of one with respect to another.

Considering the invention more in detail, some three phase device to be tested is connected as shown in the drawing. The device may be a motor, generally, transformer, or any other device having three windings which are normally identical. The device to be tested may have more than three windings, in which case the commutator may be altered from the preferred embodiment herein disclosed. Considering the specimen 10 as having windings as depicted in the drawing, windings 11, 12, and 13 are connected to a set of terminals or brushes 16, 17, and 18, respectively. The brushes 16, 17, and 18 are placed in contact with the outer circumference 15a of the commutator 15. The commutator 15 is comprised of three arcuate segments of conducting material extending to the outer circumference 15a and isolated from one another with an insulating material 15b located between the segments. The segments are numbered 15c, 15d, and 15e and are shown in contact with the brushes 16, 17, and 18, respectively. The segments 15c, 15d, and 15e are each connected electrically to the circular conductors formed on the commutator 15 therewith.

The preferred embodiment of the invention shown in the drawings discloses a printed circuit board mounted on the shaft 19. A set of contacts or brushes 20a, 21a, and 22a similar to the brushes in contact with the commutator 15 are electrically connected to portions of the circuitry of this invention. Each brush bears against a circular conductor to pick up electrical signals therefrom in a well-known manner. The circles numbered 20b, 21b, and 22b, respectively, are arranged concentrically about the shaft 19, and each circle is electrically connected to a printed wire (shown schematically) on the commutator 15 to complete a circuit extending to the commutator segments. As an example, a conducting path may be traced through the winding 11, the brush 16, the segment 15c, the circle 20b, and the brush 20a. The construction of the three electrical paths is shown somewhat schematically for it is believed that the details thereof are known to those skilled in the art, and such a device may be constructed from the disclosure of the invention contained herein. In any event, the rotation of the motor 24 or action of some other timing means sequentially connects the windings 11, 12, and 13 to the brushes 20a, 21a, and 22a and the circuitry associated with said brushes.

The indicating device used in the preferred embodiment of the invention is the cathode ray oscilloscope 25. The cathode ray oscilloscope 25, as adapted for use with this invention, has the customary sweep circuit found in cathode ray oscilloscopes. A portion of the sweep circuit is illustrated in the form of the thyratron 35, and when used with this invention, the grid 35a of the thyratron 35 is connected to a voltage source synchronized with the line voltage oscillations. The horizontal sweep of the cathode ray oscilloscope 25 is therefore triggered by the line voltage. When the thyratron 35 conducts, a surge of current flows through the cathode resistor 36 which is connected from the cathode 35c to ground. The surge of current flowing through the resistor 36 develops the trigger pulse which is coupled through a dropping resistor 37 and a coupling capacitor 38 to the grid 30a of the thyratron 30. A resistor 39 supplies a grid bias voltage to the grid 30a to the control firing level of the thyratron 30. The cathode 30c is connected to a D.-C. source, and the plate 30b is connected to the brush 22a through a plate load resistor 40.

The brush 20a is grounded, and the brush 21a is connected to the appropriate terminal of the cathode ray oscilloscope 25 to place the signal on the brush 21a on the vertical deflection plates thereof.

While the use of the invention may be apparent from the foregoing description, greater understanding thereof may be gained by considering the device when in operation. If the synchronous motor 24 and the cathode ray oscilloscope 25 receive electrical power from a 60 c.p.s. source, all events will be electrically timed as follows. If the motor 24 rotates the shaft 19 at 1200 r.p.m., the brushes of the commutator 15 will form 60 connections a second. The sweep tube 35 will form 60 trigger pulses a second which will fire the thyratron 30 at the same rate. The pulsed energy from the thyratron 30 is coupled to the commutator segment 15e which is sequentially in contact with brushes 16, 17, or 18 when the pulsed energy flows therethrough. By these timing means, a pulse of electrical energy is delivered to the windings 11, 12, and then 13 of the specimen. When the pulse of electrical energy is delivered to one of the coils, the vertical deflection plates of the cathode ray oscilloscope 25 are connected to one of the remaining windings, and the third winding is grounded.

As the pulsed electrical energy flows through the coil or winding connected thereto, the vertical deflection plates of the cathode ray oscilloscope 25 form a trace on the face of the cathode ray oscilloscope 25 which is related to the electrical characteristics of the path through which the electrical pulse flowed. As the motor 24 rotates the commutator 15, the next pulse of electrical energy results in a visual indication on the face of the cathode ray oscilloscope 25 related to a different coil. Since the horizontal sweep of the cathode ray oscilloscope 25 is triggered by the line voltage which also synchronizes all portions of the test device, each sweep forms an indication relating to one coil and then the next sweep forms an indication relating to another coil. The phosphor of the cathode ray tube normally glows some time after the electron beam has passed over the face of the cathode ray tube so that two or three different indications are placed on the cathode ray oscilloscope 25 at one time. If the visual signals created by the cathode ray oscilloscope 25 are identical regardless of the coil connected to the vertical deflection plates, the traces in the phosphor of the cathode ray tube will be identical, and reinforce one another. If for some reason one coil is not identical, the traces on the face of the cathode ray tube will be different and give the operator an indication that one winding of the specimen 10 is not identical to the others. For ease of identification, a voltage divider 50 may be attached to first one coil and then another in an attempt to detect the irregular winding. The voltage divider 50 may be electrically connected to blank the trace related to the coil or winding to which the divider 50 is connected by pressing the push button 51. As shown in the drawing, the divider 50 is connected to the coil 13 and will place a blanking voltage on the grid of the cathode ray tube when the coil 13 is connected to the vertical deflection plates of the cathode ray oscilloscope 25. Of course, the divider 50 may be quickly connected and disconnected from one winding to the next by use of quickly actuated connective means such as alligator clips.

The device has certain other uses which may not be apparent. For instance, it may be used to compare a group of single phase devices for items having only one coil) if three of the devices are electrically connected to form a circuit similar to the one of the specimen 10. By the use of two "standard" single coil devices, all production of similar devices may be tested. Further, an overlay pattern may be formed in clear plastic and attached to the face of the cathode ray tube and used for comparison purposes.

The invention may be used for testing devices having more than three coils or windings which are supposedly identical. A brush may be attached to each coil or winding and placed in contact with the circumference 15a of the commutator 15. The brushes are normally spaced equidistantly arcuately around the circumference of the commutator 15 to avoid connection of two brushes with one conducting segment of the commutator 15. Since the windings are tested one at a time, the segment 15e is constructed with a width which enables it to contact only one brush at a time. Likewise, the segment 15d is constructed to contact only one coil at a time to provide a trace on the cathode ray tube related to conduction through one coil. And the segment 15c may be extended arcuately of the commutator 15 to ground the coils connected to all brushes, but the two hereinabove mentioned as in contact with the segments 15d and 15e.

The test device of this invention may be operated with synchronizing means other than an alternating current supply voltage; however, an A.-C. voltage provides the cheapest means available for synchronization of the invention. Further, use of a single synchronizing voltage permits variations in the frequency thereof without interfering with the test results. If the motor 24 or other power means slows due to a decrease in A.-C. voltage frequency, the pulse of electrical energy and the horizontal sweep of the cathode ray oscilloscope 25 will decrease in frequency so that all portions of the invention remain synchronized with one another.

Various alterations may be made in the preferred embodiment herein disclosed. An electronic switch may be designed to replace the motor 24 and commutator 15. The indicating means may be altered to include a recording device which forms a permanent record of the test results. Those skilled in the art may further alter the invention to incorporate desired features.

Broadly, this invention is related to a test device for testing coils or windings, and more specifically, test coils or windings for similarity with respect to one another.

What is claimed is:

1. A test device for testing a plurality of windings, coils, or the like having a common connection for similarity with respect to one another comprising,
   (a) a source of pulsed electrical energy connected to a contact,
   (b) indicating means having a contact for connection thereto to form a representation of the voltage wave form of a signal connected to the contact,
   (c) a set of at least three terminals for connection to each of a plurality of coils to be tested,
   (d) timing means connecting said contacts to a pair of said set of terminals for a period of time sufficient to allow at least one pulse of energy from said source of pulsed electrical energy to be formed, said timing means then connecting said contacts to another pair of said set of terminals, and so on, said timing means consecutively connecting different pairs of contacts of said set to provide a representation of several voltage wave forms for comparison of several different pairs of coils to be tested, and
   (e) said set of terminals and said timing means constituting the sole means providing the several voltage wave forms to said indicating means.

2. The invention recited in claim 1 wherein said indicating means is a cathode ray oscilloscope.

3. The invention recited in claim 1 wherein said contacts and said set of terminals are segments of a commutator and commutator brushes.

4. The invention recited in claim 1 wherein said timing means is synchronized with said source of pulsed electrical energy.

5. The invention recited in claim 1 wherein marker circuit means is attached to one of said plurality of coils to be tested.

6. A test device for testing a plurality of windings, coils, or the like having a common connection for similarity with respect to one another comprising,
 (a) a source of pulsed electrical energy,
 (b) a cathode ray oscilloscope,
 (c) a commutator having at least three segments arranged about the circumference thereof with one of said segments connected to said source of pulsed electrical energy and another of said segments connected to said cathode ray oscilloscope,
 (d) at least three commutator brushes in communication with the segments of said commutator and also connected to each of a plurality of coils to be tested,
 (e) power means imparting rotation to said commutator in synchronization with said source of pulsed electrical energy so that at least one pulse of electrical energy is communicated to each commutator brush by said source of pulsed electrical energy and
 (f) said commutator and said commutator brushes constituting the sole means communicating pulses from said source of pulsed electrical energy to the plurality of coils to be tested.

7. A test device for testing a plurality of windings, coils, or the like having a common connection for similarity with respect to one another comprising,
 (a) a source of pulsed electrical energy,
 (b) a cathode ray oscilloscope,
 (c) a commutator having at least three segments arranged about the circumference thereof and mounted on a shaft for rotation,
 (d) pick up means mounted on said shaft forming electrical connections from said source of pulsed electrical energy and said cathode ray oscilloscope to segments of said commutator,
 (e) at least three commutator brushes in communication with the segments of said commutator and also connected to each of a plurality of coils to be tested,
 (f) power means imparting rotation to said shaft in synchronization with said source of pulsed electrical energy so that at least one pulse of electrical energy is communicated to each commutator brush by said source of pulsed electrical energy and
 (g) said commutator and said commutator brushes constituting the sole means communicating pulses from said source of pulsed electrical energy to the plurality of coils to be tested.

References Cited by the Examiner
UNITED STATES PATENTS

| 2,321,424 | 6/1943 | Rohats | 324—54 |
| 2,466,079 | 4/1949 | Brunt | 324—52 |
| 2,815,481 | 12/1957 | Rohats | 324—54 |

WALTER L. CARLSON, *Primary Examiner.*

G. R. STRECKER, *Assistant Examiner.*